United States Patent [19]

Murphy

[11] 4,383,007
[45] May 10, 1983

[54] BATTERY COMPARTMENT

[75] Inventor: Harold R. Murphy, Herkimer, N.Y.

[73] Assignee: General Electric Company, New York, N.Y.

[21] Appl. No.: 319,821

[22] Filed: Nov. 9, 1981

Related U.S. Application Data

[63] Continuation of Ser. No. 161,784, Jun. 23, 1980, abandoned.

[51] Int. Cl.$^3$ .............................................. H01M 2/20
[52] U.S. Cl. ........................................ 429/1; 429/96; 339/119 R
[58] Field of Search ........................ 429/1, 96, 97, 100, 429/98, 99, 123; 368/203, 204; 339/105, 253 S, 258 RR, 119 R, 253 R

[56] References Cited

U.S. PATENT DOCUMENTS

| | | | |
|---|---|---|---|
| 852,188 | 4/1907 | Manville | 429/96 |
| 2,397,469 | 4/1946 | Casanov | 429/1 |
| 3,000,999 | 9/1961 | Schlau | 429/99 |
| 3,181,974 | 5/1965 | LaBarbera | 429/123 X |
| 3,984,257 | 10/1976 | Zurcher | 429/1 |
| 3,999,110 | 12/1976 | Ramstrom et al. | 429/96 X |
| 4,226,497 | 10/1980 | Polonsky et al. | 429/1 X |

*Primary Examiner*—Anthony Skapars
*Attorney, Agent, or Firm*—Carlos Nieves; John R. Rafter; George R. Powers

[57] ABSTRACT

A radio cabinet includes a compartment for three AAA size batteries. The compartment includes a housing having integral means for holding contacts which are intended to engage the batteries only when the batteries are placed in the housing in a predetermined way. The contacts are connected to provide a series-aiding arrangement of the batteries. If any one or more of the batteries is improperly inserted into the housing, electrical continuity is prevented by said integral means.

14 Claims, 7 Drawing Figures

BATTERY COMPARTMENT

This application is a continuation of application Ser. No. 161,784, filed June 23, 1980 now abandoned.

BACKGROUND OF THE INVENTION

1. Field of the Invention

The subject invention relates to battery compartments which include means for preventing electrical contact with both terminals of a battery if the battery is improperly aligned during insertion into the compartment.

2. Description of Prior Art

Battery compartments or holders which receive batteries regardless of polarity orientation but which provide electrical continuity only when batteries are inserted in a predetermined way are well known. In fact, U.S. Pat. Nos. 2,397,469 and 3,984,256 disclose apparatus of this type.

U.S. Pat. No. 2,397,469 discloses a battery holder having a U-shaped metallic bracket. One end of the bracket supports a socket manufactured from an insulating material and a conductor recessed in the socket. The other end of the bracket supports a conical spring contact which is soldered thereto. In operation, the spring contact abuts one end of a battery and urges a protruding terminal at its other end into engagement with the recessed contact. If the battery is inserted in an opposite direction, the recessed contact is not engaged.

U.S. Pat. No. 3,984,256 discloses an electrical device having a battery compartment for receipt of a battery having a protruding terminal on one end, and a cover for closure of the compartment. An insulated key ring and a contact disc are located in the compartment for making electrical contact with the protruding terminal when the battery is inserted in the compartment with the correct polarity orientation and for preventing electric contact with the protruding terminal when the battery is inserted in the compartment with incorrect polarity orientation. The structure permits closure of the compartment with the battery having correct or incorrect polarity orientation. The insulated key ring has an interior diameter greater than the diameter of the protruding terminal and the contact disk extends beyond the interior diameter to readily permit engagement by the terminal. The contact disk includes a number of springs which urge it towards the compartment opening so that when a battery is inserted in the compartment with correct polarity orientation, the protruding terminal contacts the contact disk and, when the battery is inserted in the compartment with incorrect polarity orientation, the battery case engages the insulated key ring without electric engagement with the contact disk, thereby preventing electrical continuity.

SUMMARY OF THE INVENTION

As was the case in the past, it is an object of the present invention to provide a battery compartment which receives batteries regardless of polarity alignment but which provides electrical contact with both terminals of each battery only when the batteries are inserted in a predetermined way.

Yet another object of the present invention is to provide a battery compartment which only has a small number of different parts and is readily assembled.

The invention herein may be described broadly as a battery compartment for batteries of the type having a cylindrical body and a first terminal protruding from one of its ends to provide a first electrical potential, the other end of the cylindrical body including a second terminal which provides a second electrical potential. Structurally, the battery compartment includes: a first contact member, the contact member being resilient; a second contact member; and a housing. The housing has first integral means for holding the first contact member and second integral means for holding the second contact member opposite the first contact member. The second integral means includes an opening which is suitable for accommodating the first terminal in abutment with the second contact and a surface for preventing engagement between the second contact and the second terminal. The first and second contacts are spaced apart a predetermined distance, such that when a battery is properly inserted in the compartment its second terminal compresses the first contact and the resulting compression force biases the first terminal against the second contact member.

A BRIEF DESCRIPTION OF THE DRAWING

The above-mentioned and other objects and features of the invention will become apparent by reference to the following description in conjunction with the accompanying drawing, in which.

DESCRIPTION OF PREFERRED EMBODIMENT

Figure 1:
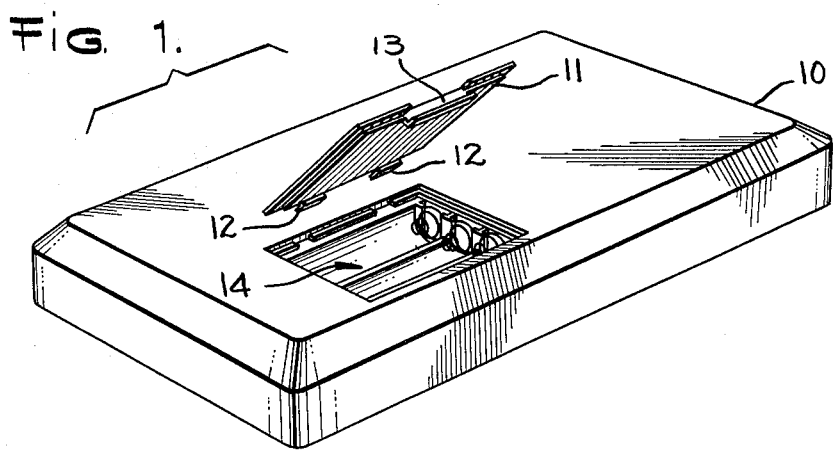
FIG. 1 is a perspective view of a radio cabinet having a battery compartment according to the invention.

A radio cabinet 10 having a battery compartment 14, according to the invention and an associated cover 11 is shown in FIG. 1. Cover 11 is of the conventional type in that it includes a pair of extensions 12 which are engageable with the radio cabinet and a flexible latch 13 which is also engageable with the cabinet to secure the cover in place. In operation the cover may be separated from the cabinet by disengaging the latch, pivoting the cover about extensions 12, and lifting the cover away from the cabinet, as is shown in the figure.

Figure 2:
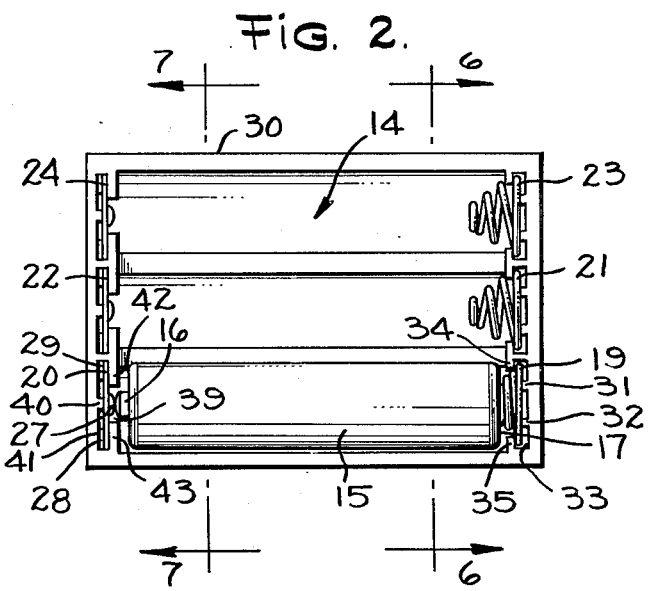
FIG. 2 is a top plan view of the battery compartment.

Referring to FIG. 2, exemplary battery compartment 14 is structured to support three AAA size batteries 15, only one of which is shown. Battery 15 includes a cylindrical body having a first terminal 16 protruding from one of its ends to provide a first electrical potential and the other end of the body includes a second terminal 17 which provides a second electrical potential.

As may be seen, compartment 14 includes three similar sections for supporting the batteries. A first of the sections includes a resilient contact member 19 and a formed contact 20; a second of the sections includes a resilient contact member 21 and a formed contact 22; and a third of the sections includes a resilient contact 23 and a formed contact 24. Contact 19, which is shown in perspective in FIG. 4, and contacts 21 and 23 are similar and contact 20, which is shown in perspective in FIG. 5, and contacts 22 and 24 are similar.

Figure 4:
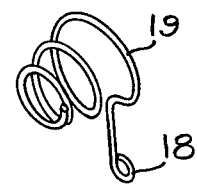
FIG. 4 is a perspective view of a resilient contact member of the battery compartment.

Referring to FIG. 4, contact 19 is a conically shaped compression spring having an end which extends away from the large diameter coil of the spring to provide a lug. The contact is manufactured from music wire which is nickel plated.

Figure 5:
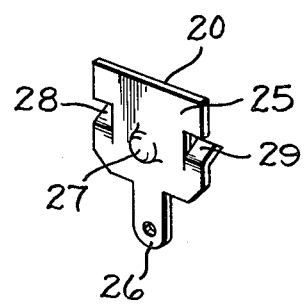
FIG. 5 is a perspective view of another contact member of the battery compartment.

As shown in FIG. 5, contact 20 is a sheet metal structure having a base section 25 and a lug 26. The base section has a centrally located raised section 27 which is flanked by tabs 28 and 29, which generally extend in a direction away from the lug and the raised section. The contact may be manufactured from steel and is nickel plated.

The housing 30 of the compartment includes first integral means for holding contact 19 and second integral means for holding contact 20 opposite contact 19, the second integral means including an opening 39 which accommodates terminal 16 in abutment with raised section 27. The contacts 19 and 20 are spaced apart a predetermined distance such that when a battery is properly inserted in the compartment (as is shown) its terminal 17 compresses contact 19 and the resulting compression force biases the terminal 16 against raised section 27.

The first integral means holds an end section of spring 19. Specifically, the first integral means includes a pair of ridges 31 and 32 against wall 33 of the housing and a pair of tabs 34 and 35 for engaging the large diameter coil of the spring. The tabs are positioned to press the coil against the ridges to provide a frictional engagement. Housing 30 includes a hole 38 (see FIG. 3), near the ridges 31 and 32, such that when the spring is engaged with the housing, lug 18 will extend through the hole. As may be seen, lug 18 is connected to a wire.

The second means includes a ridge 40 located against wall 41 and a couple of tabs 42 and 43 which bias contact 20 against ridge 40 and tabs 28 and 29 against wall 41. Ridge 40 supports the contact when terminal 16 presses against raised section 27. Tabs 28 and 29 slide against wall 41 when the contact is brought into proper engagement with the integral holding means and dig into wall 41 if an attempt is made to pull the contact out of the housing. Housing 30 includes a hole 45 (see FIG. 3) near ridge 40 and tabs 42 and 43 such that when the contact is held, lug 26 extends through the hole. As may be seen, lug 26 is also connected to a wire.

Figure 6:
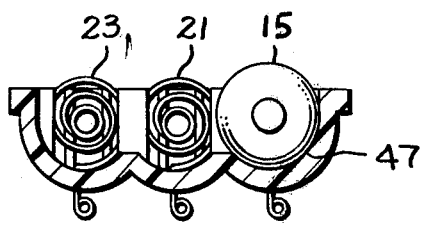
FIG. 6 is a cross-sectional view of the battery compartment taken along line 6—6 in FIG. 2.
Figure 7:
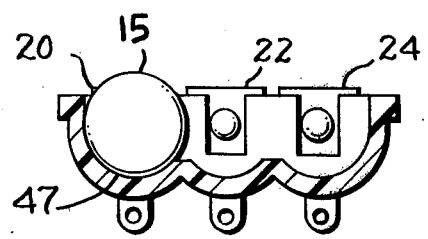
FIG. 7 is a cross-sectional view of the battery compartment taken along line 7—7 in FIG. 2.

Referring to FIGS. 2, 6, and 7, housing 30 provides a seat for each of the batteries to be inserted. As shown in contact with battery 15, a typical seat includes a cylindrical surface 47 having a radius of curvature equal to that of the battery or slightly larger. When the cover 11 of the compartment is in place, the batteries are in near contact with the cover and, therefore, the batteries remain substantially in place when the cabinet is moved around.

Figure 3:
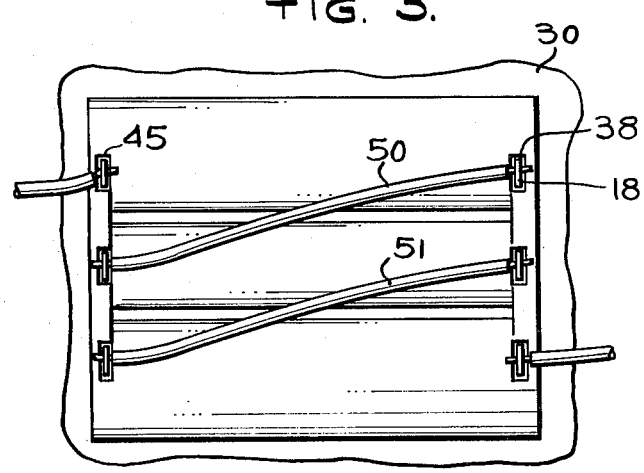
FIG. 3 is a partial inside view of the cabinet, showing the back side of the battery compartment.

As shown in FIG. 3, the lugs of contacts 19 and 22 are connected by a wire 50 and the lugs of contacts 21 and 24 are connected by a wire 51. Therefore, three batteries properly seated in the compartment will be electrically in series.

If, for example, a battery such as 15 is improperly placed in the compartment with its terminals reversed, terminal 17 will be kept out of engagement with contact 20 by surfaces on tabs 42 and 43. Accordingly, electrical continuity is maintained in the compartment only when all of the batteries in it are properly seated.

Housing 30 may be molded from plastic and allows rapid completion of the compartment in that contacts slip easily into place for wiring. As a result, the compartment is inexpensive to manufacture.

The described battery compartment may be modified by persons skilled in the art to which the invention pertains in ways which are consistent with the spirit of the invention. For example, although a three-battery compartment has been described, compartments for one or any number of batteries can be manufactured. Therefore, it should be understood that the description herein of a preferred embodiment, according to the invention, has been set forth as an example thereof and should not be construed or interpreted to limit the scope of the claims which follow and define the invention.

What is claimed is:

1. A battery compartment for batteries of the type having a cylindrical body and a first terminal protruding from one of its ends to provide a first electrical potential, the other end of the cylindrical body including a second terminal which provides a second electrical potential, comprising:
    (a) a first contact member, the contact member being resilient;
    (b) a second contact member having at least one tab; and
    (c) a unitary housing having first means for frictionally holding the first contact member and second means cooperating with said at least one tab for frictionally holding the second contact member opposite the first contact member, said second means including an opening which is suitable for accommodating the first terminal in abutment with the second contact and a surface for preventing engagement between the second contact and the second terminal, the first and second contacts being spaced apart a predetermined distance, whereby when a battery is properly inserted in the compartment its second terminal compresses the first contact and the resulting compression force biases the first terminal against the second contact member.

2. A battery compartment, as defined in claim 1, wherein the first contact member is a compression spring and the first means hold an end section of the spring.

3. A battery compartment, as defined in claim 2, wherein the first means includes a pair of tabs for biasing the end section against one wall of the housing, whereby the spring is frictionally held.

4. A battery compartment, as defined in claim 3, wherein said one wall of the housing includes at least one ridge wherein the end section includes one coil, and wherein the pair of tabs bias said one coil against said at least one ridge.

5. A battery compartment, as defined in claim 4, wherein the housing includes a hole adjacent the first means and said one coil includes a lug extending through said hole adjacent the first integral means.

6. A battery compartment, as defined in claim 3, wherein the second means includes a couple of tabs for biasing the second contact member against another wall of the housing.

7. A battery compartment, as defined in claim 6, wherein the housing includes a hole adjacent the second means and wherein the second contact member includes a raised section extending into the opening and a lug extending through the hole.

8. A battery compartment, as defined in claim 7, wherein the housing includes a seat having a cylindrical surface for accommodating a properly inserted battery.

9. A battery compartment, as defined in claim 7, wherein said one wall of the housing includes at least one ridge wherein the end section includes one coil, and wherein the pair of tabs bias said one coil against said at least one ridge.

10. A battery compartment, as defined in claim 9, including a cover for the housing, the cover being located to restrict movement of a properly mounted battery.

11. A battery compartment as defined in claim 1 wherein said at least one tab of said second contact member is angularly articulated from the plane of said second contact member.

12. A battery compartment as defined in claim 11 wherein said second contact member includes a raised portion, a lug and said at least one tab extends in the direction away from said lug and said raised portion.

13. A battery compartment as in claim 6 wherein said pair of tabs included in said first means for holding defines a first opening, and wherein said couple of tabs included in said second means for holding defines a second opening, such that the width of the first opening is larger than the second opening.

14. A battery compartment as in claim 1 wherein said at least one tab means has at least one outwardly projecting edge, said first means for holding includes at least one wall abutting said edge, and wherein said tab means projects into said wall in the direction of extraction of said second contact member.

* * * * *